Patented June 24, 1952

2,601,253

UNITED STATES PATENT OFFICE 2,601,253

POLYMERIC COMPOSITIONS AND METHOD OF SHAPING SAME

Herman A. Bruson, Shaker Heights, Ohio, assignor to Industrial Rayon Corporation, Cleveland, Ohio, a corporation of Delaware No Drawing. Application June 13, 1949, Serial No. 98,877

33 Claims. (Cl. 18—54)

The present invention relates to the production of stabilized polymer-solvent compositions having a minimum of discoloration. More particularly, it relates to the production of certain acrylonitrile polymer spinning solutions and the process of forming therefrom, shaped articles such as fibers, threads, yarns, films, etc., of improved white color without substantially any discoloration. The improved spinning solutions of the present invention are made from organic solvents and homopolymers and copolymers of acrylonitrile which polymers contain at least 80% by weight of acrylonitrile in the polymer molecule. Such homopolymers and copolymers are referred to herein as "polymers." The term "spinning solution" is intended to include extrudable polymer-solvent masses in the form of solid or semi-solid gels, viscous liquids, dispersions and true solutions.

In the production of synthetic shaped articles from polymers of acrylonitrile, it is usually necessary to dissolve the polymers in a suitable organic solvent by means of heat, and to maintain such solutions at elevated temperatures for prolonged periods of time during the spinning operation such as, for example, extruding such heated solutions into either heated air or hot liquid coagulating baths. During such operations, the color of the spinning solutions undergoes a progressive darkening which affects the color of the articles produced.

According to the present invention, the discoloration in spinning solutions of organic solvents with homopolymers or copolymers of acrylonitrile which contain at least 80% by weight of acrylonitrile in the polymer molecule, is inhibited by incorporating into such polymer solutions a relatively small quantity of a water-soluble, hydroxy-aliphatic mercaptan containing only one free —SH group. Advantageously, such spinning solutions may be extruded into a liquid coagulating medium and the freshly coagulated material then washed with water to form shaped articles of improved whiteness and physical properties.

Typical water-soluble hydroxy-aliphatic mono-mercaptans which can be used for the purpose of this invention are, for example, the following:

$HO-CH_2-CH_2-SH$

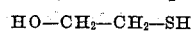
2-hydroxy ethyl mercaptan $HOCH_2-CH_2CH_2-SH$

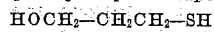
3-hydroxy-propyl mercaptan $HOCH_2-CH-CH_3$
                |
               $SH$

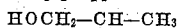
3-hydroxy-2-mercapto propane $HOCH_2-CHOH-CH_2-SH$

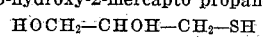
2,3-dihydroxy-1-mercapto propane $HS-CH_2CH_2-O-CH_2CH_2OH$

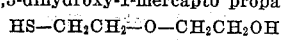
beta-mercaptoethoxyethanol

In general, filamentary products such as threads and yarns of higher quality can be produced when the mono-mercaptans having greater solubilities in water are employed. Similar advantages are derived when such mercaptans contain not more than one sulfur atom. Particular advantages are derived with 2-hydroxy ethyl mercaptan.

The quantity of the mono-mercaptans of the present invention which may be used to inhibit the formation of color in solutions of acrylonitrile polymers is relatively small; minor proportions in amounts of the order of 0.02 to 3%, based on the weight of the actual polymer solids, being sufficient for the purposes of the present invention.

Special advantages are derived from the present invention when employing certain types of polymer spinning solutions. For example, color stabilization becomes particularly important when copolymers or acrylonitrile with other basic nitrogeneous vinyl compounds such as vinylpyridine, mono-vinyl ethers of amino alcohols and water-soluble salts of such compounds, are wet spun from heated organic solvents such as, for example, ethylene carbonate, into heated coagulating baths. Among such copolymerizable nitrogeneous compounds may be mentioned 2-vinylpyridine, beta-dimethylaminoethyl vinyl ether, beta-diethylaminoethyl vinyl ether, morpholinoethyl vinyl ether and their homologues. Such copolymerizable bases are usually found desirable for imparting dyeing properties to shaped articles such as threads, yarns, etc. Their presence, however, accentuates the discoloration and darkening tendency of the spinning solution and the articles produced. In practicing this invention, it is found advantageous to employ copolymers comprising less than 10 mole percent of such basic vinyl compounds in the polymer molecule and with particular advantage between about 2 and 7%.

The following examples in which the parts and percentages given are by weight will further illustrate this invention. It is undestood, however, that the invention is not intended to be limited by these examples:

Example I

A mixture of 20 parts polyacrylonitrile (mol. wt. about 60,000), 80 parts ethylene carbonate, and 0.02 part 2-mercaptoethanol (2-hydroxy ethyl mercaptan) was heated in air at 100° C. for ten hours. The clear solution obtained had a very faint yellow color. A mixture of the same quantities of the same ingredients but without the mercaptoethanol, turned a dark amber color in ten hours at 100° C. Thereafter, while maintaining both solutions at such temperatures, they were extruded through 40-hole spinnerets (0.003 inch orifice diameters) into a coagulating bath of triethylene glycol at about 120° C. and processed as follows: The coagulated bundle of filaments was led between two guides for a distance of 25 inches bath travel to a second bath consisting of triethyl glycol heated to 140° C. where it was stretched between two rotating drums to about 8.55 times its original length, the second drum being driven at about 125 meters per minute. The yarns thus obtained were washed with warm water and air dried.

The yarns were then passed in a relaxed condition through a heated chamber positioned between two positively-driven drums having different peripheral speeds, at 135° C. for five minutes. The second or take-up drum was rotated 0.855 times as rapidly as the first of the pair of drums, to yield yarns having tenacities of about 4.4 grams per denier and elongations at break of about 17%.

The yarn obtained from the spinning solution containing the 2-mercaptoethanol, was a white odorless product. No mercaptoethanol could be detected in the washed yarn. The yarn produced from the other spinning solution, however, had a yellowish cream color. The tenacity and elongation values of both yarns were the same.

*Example II*

(a) A copolymer of 95% acrylonitrile and 5% 2-vinylpyridine (mol. wt. about 55,000) was dissolved in ethylene carbonate to give a 20% spinning solution.

(b) A sample of the same copolymer was dissolved in N,N-dimethyl formamide to give a 20% spinning solution.

Each solution was heated at about 110° C. in air for 18 hours. Both solutions turned a dark amber color, but solution (a) showed somewhat less discoloration than solution (b).

Upon repeating the above experiments, but with the addition of 0.2% 2-mercaptoethanol, based on the weight of the polymer, to each solution before the heating began, the color of the final spinning solutions obtained after 18 hours' heating at 110° C., was a pale yellow color. Yarn was then produced from these spinning solutions in the manner described in Example I. In each case, the yarns which were obtained by spinning the mercaptoethanol-containing solutions were odorless and also were lighter in color than those obtained from the control solutions containing no mercaptoethanol.

*Example III*

Mixtures containing 20% by weight of the following acrylonitrile copolymers were prepared in ethylene carbonate:

(a) 98% acrylonitrile—2% morpholinoethyl vinyl ether. (Mol. wt. about 58,000.)

(b) 97% acrylonitrile—3% diethylaminoethyl vinyl ether. (Mol. wt. about 63,000.)

(c) 95% acrylonitrile—5% piperidinoethyl vinyl ether. (Mol. wt. about 65,000.)

Corresponding mixtures (d), (e), and (f), respectively, were prepared which were similar to the above, except that each contained in addition, 0.1% 2-mercaptoethanol based on the weight of the copolymers.

The six mixtures were placed in open test tubes and heated in a glycerine bath at 100° C. for a period of 24 hours. At the end of this time, solutions (a), (b), and (c) were dark amber in color for a depth of about ¼ inch from the top surfaces exposed to the air, whereas the corresponding mercaptan-containing solutions (d), (e), and (f) remained a pale yellow color throughout.

In a similar manner the other water-soluble hydroxy-aliphatic mono-mercaptans can be used in place of 2-mercaptoethanol to give both color-stabilized polymer solutions and also white thread and yarn products.

Among the organic solvents which can be used in the practice of the present invention to prepare the polymeric acrylonitrile spinning solutions are the known nitrogeneous solvents such as cyclic amides, dinitriles, formylated amines e. g. N,N-dimethyl formamide, etc. Greater advantages, however, are derived by employing the cyclic carbonates of 1,2-, 2,3-, and 1,3-dihydric aliphatic alcohols having no more than four carbon atoms in their alkylene radical such as, for example, propylene carbonate, trimethylene carbonate, 1,2-butylene carbonate, 1,3-butylene carbonate, 2,3-butylene carbonate and isobutylene carbonate, and particularly, ethylene carbonate.

Thread and yarn products having especially advantageous properties such as high orientation, high tenacity, high elastic recovery, low shrinkage, low discoloration, high stability, etc., may be prepared from the compositions of this invention by using polyacrylonitrile or acrylonitrile copolymers (containing at least 80% acrylonitrile) of vinyl esters such as vinyl acetate, vinyl formate, vinyl benzoate; vinyl ethers; and vinyl ketones; acrylic acid and its esters and amides; methacrylic acid and its esters, amides, and nitrile; maleic, itaconic, fumaric acids and their esters, amides and nitriles; allyl alcohol and its esters; styrene and nuclear substituted styrenes; and the like.

For various purposes it may be desirable to chemically and physically modify the polymeric compositions of this invention by the presence of other materials such as, for example, pigments, dyes, plasticizers, spinning agents, etc.

The homopolymers and copolymers of acrylonitrile which can be employed with advantage are those possessing average molecular weights of from about 30,000 to 150,000.

In general, polymer spinning solutions suitable for practicing this invention may be prepared by heating a mixture consisting of finely divided acrylonitrile polymer, an organic solvent therefor and a mono-mercaptan compound of the type described herein, to temperatures from about 50° C. to 100° C. For example, the solvent, ethylene carbonate, may be used with advantage to produce a spinning solution having a solids content between about 10% and 35% solids. Advantageously, the heated mixtures of polymer and solvent or solutions thereof are maintained, prior to extrusion, in inert or oxygen-free atmospheres to further minimize discoloration. The temperature of the spinning solutions at extrusion may be maintained with advantage between about 50° C. and 150° C. However, if desired, under suitable conditions, even higher temperatures may be employed such as, for example, up to about 175° C. Such spinning solutions may then be extruded into a liquid coagulating medium maintained at temperatures between about 50° C. and 150° C. or if desired, under suitable conditions, at higher temperatures such as, for example, up to about 170° C. The liquid coagulating medium may, with advantage, consist of polyalkylene ether glycols such as, for example, triethylene glycol, tetraethylene glycol, etc. Such coagulating media may consist of such glycols alone or such glycols may be diluted with suitable amounts of other materials such as, for example, varying quantities of water or other organic compounds. In general, when water is employed in combination with the glycol ethers, the lower bath temperatures may be employed with advantage.

The resulting coagulated material may then be withdrawn from the liquid coagulating medium and thereafter washed with an aqueous medium such as water, whereby the mono-mercaptan compounds present in the freshly extruded material are readily removed together with any solvent and coagulating medium that may also be present on the formed article. Washed articles such as threads and yarns may thereafter be stretched up to 600–1000 percent or more. Such stretching may be accomplished in secondary baths containing materials similar to those of the coagulating medium employed, or if desired, other heated media may be employed, such as, for example, inert liquids, vapors or gases, e. g. steam.

The stretched products may be heat treated while in a relaxed condition at temperatures of between about 100° C. and 180° C. to improve their physical properties. The expression "relaxed condition" is intended to include the heat treatment of threads and yarns at no tension at all or preferably, at relatively low tensions such as, for example, between about 0.01 and 0.3 gram per denier.

Oleaginous materials such as finishing oils or waxes, may be applied to the yarn and thread products after the heat treating step, or if desired, before the heat treating step.

The present invention not only provides a color-stabilized spinning solution but in addition, provides a wet-spinning process for making improved polymer products. Thus, for example, the hydroxy mercaptan compounds of the present invention do not affect the efficiency of polymer solvents such as, for example, the cyclic alkylene carbonates and particularly, ethylene carbonate. Particular advantages are derived in this connection when employing ethylene carbonate as the polymer solvent since neither the solvent efficiency nor the stability of the carbonate is adversely affected. Moreover, the water-soluble mercaptan compounds herein are easily washed with water from the freshly coagulated and spun materials to yield white odorless products. In addition to being white and odorless, the other physical properties of the filamentary materials produced according to this invention are not adversely affected.

I claim:

1. A spinning solution useful for the formation of filamentary material comprising a polymer of acrylonitrile containing in the polymer molecule at least 80% by weight of acrylonitrile; ethylene carbonate; and a relatively small amount of a water-soluble, hydroxy-aliphatic mono-mercaptan.

2. A spinning solution useful for the formation of filamentary material comprising a polymer of acrylonitrile containing in the polymer molecule at least 80% by weight of acrylonitrile; ethylene carbonate; and a relatively small amount of 2-hydroxy ethyl mercaptan.

3. A spinning solution useful for the formation of filamentary material comprising a polymer of acrylonitrile containing in the polymer molecule at least 80% by weight of acrylonitrile; ethylene carbonate; and a relatively small amount of 3-hydroxy propyl mercaptan.

4. A spinning solution useful for the formation of filamentary material comprising a polymer of acrylonitrile containing in the polymer molecule at least 80% by weight acrylonitrile; ethylene carbonate; and a relatively small amount of 3-hydroxy-2-mercapto propane.

5. A spinning solution useful for the formation of filamentary material comprising a polymer of acrylonitrile containing in the polymer molecule at least 80% by weight of acrylonitrile; ethylene carbonate; and a relatively small amount of 2,3-dihydroxy-1-mercapto propane.

6. A spinning solution useful for the formation of filamentary material comprising a polymer of acrylonitrile containing in the polymer molecule at least 80% by weight of acrylonitrile; ethylene carbonate; and a relatively small amount of beta-mercaptoethoxyethanol.

7. A composition useful for the formation of filamentary material comprising (1) the polymerization product of a mixture comprising acrylonitrile and less than about 10 mole per cent of a compound selected from the group consisting of vinylpyridine, water-soluble vinylpyridine salts, mono-vinyl ethers of amino alcohols and water-soluble salts of mono-vinyl ethers of amino alcohols; (2) ethylene carbonate; and (3) a relatively small amount of a water-soluble, hydroxy-aliphatic mono-mercaptan.

8. A composition according to claim 7 in which the polymerization product contains copolymerized 2-vinylpyridine.

9. A composition according to claim 7 in which the polymerization product contains a copolymerized mono-vinyl ether of an amino alcohol.

10. A composition according to claim 7 in which the polymerization product contains copolymerized beta-dimethylaminoethyl vinyl ether.

11. A composition according to claim 7 in which the polymerization product contains copolymerized beta-diethylaminoethyl vinyl ether.

12. A composition according to claim 7 in which the polymerization product contains copolymerized morpholinoethyl vinyl ether.

13. A composition useful for the formation of filamentary material comprising (1) the polymerization product of a mixture comprising acrylonitrile and less than about 10 mole per cent of morpholinoethyl vinyl ethers; (2) ethylene carbonate; and (3) a relatively small amount of 2-hydroxy ethyl mercaptan.

14. A method of preparing acrylonitrile polymer spinning solutions comprising the steps, admixing a polymer of acrylonitrile containing in the polymer molecule at least 80% by weight of acrylonitrile with an organic solvent therefor; and incorporating into said mixture a relatively small amount of a water-soluble hydroxy-aliphatic mono-mercaptan.

15. A method of preparing acrylonitrile polymer spinning solutions comprising the steps, admixing a polymer of acrylonitrile containing in the polymer molecule at least 80% by weight of acrylonitrile with ethylene carbonate; and incorporating into said mixture a relatively small amount of a water-soluble hydroxy-aliphatic mono-mercaptan.

16. A method of preparing acrylonitrile polymer spinning solutions comprising the steps, admixing a polymer of acrylonitrile containing in the polymer molecule at least 80% by weight of acrylonitrile with ethylene carbonate; incorporating into said mixture a relatively small amount of a water-soluble hydroxy-aliphatic mono-mercaptan; and heating said resulting mixture to an elevated temperature.

17. A method of preparing acrylonitrile polymer spinning solutions comprising the steps, admixing a polymer of acrylonitrile containing in the polymer molecule at least 80% by weight of acrylonitrile with ethylene carbonate; incorporating into said mixture a relatively small amount of 2-hydroxy ethyl mercaptan; and heating said resulting mixture to an elevated temperature.

18. A method of forming a shaped article which comprises, admixing a polymer of acrylonitrile, containing in the polymer molecule at least 80% by weight of acrylonitrile, with an organic solvent therefor; incorporating into said mixture a relatively small amount of a water-soluble, hydroxy - aliphatic mono - mercaptan; heating said resulting mixture to an elevated temperature and thereafter extruding said heated mixture into a liquid coagulating medium.

19. A method of forming a shaped article which comprises, admixing a polymer of acrylonitrile, containing in the polymer molecule at least 80% by weight of acrylonitrile, with ethylene carbonate; incorporating into said mixture a relatively small amount of a water-soluble, hydroxy - aliphatic mono - mercaptan; heating said resulting mixture to an elevated temperature and thereafter extruding said heated mixture into a liquid coagulating medium.

20. A method of forming a shaped article which comprises, admixing a polymer of acrylonitrile, containing in the polymer molecule at least 80% by weight of acrylonitrile, with ethylene carbonate; incorporating into said mixture a relatively small amount of a water-soluble, hydroxy - aliphatic mono - mercaptan; heating said resulting mixture to an elevated temperature and thereafter extruding said heated mixture into a liquid coagulating medium; said coagulating medium being heated to an elevated temperature.

21. A method of forming filamentary material which comprises, admixing a polymer of arcylonitrile, containing in the polymer molecule at least 80% by weight of acrylonitrile, with ethylene carbonate; incorporating into said mixture a relatively small amount 2-hydroxy ethyl mercaptan; heating said resulting mixture to an elevated temperature and thereafter extruding said heated mixture through a spinneret into a liquid coagulating medium; said coagulating medium; said coagulating medium being heated to an elevated temperature.

22. A method of forming a shaped article which comprises extruding into a liquid coagulating medium, a composition comprising (1) to a polymer of acrylonitrile containing in the polymer molecule at least 80% by weight of acrylonitrile, (2) an organic solvent therefor, and (3) a relatively small amount of a water-soluble, hydroxy-aliphatic mono-mercaptan; removing the resulting coagulated material from said coagulating medium; and washing said coagulated material with an aqueous medium.

23. A method of forming filamentary material which comprises extruding into a liquid coagulating medium, a composition comprising (1) a polymer of acrylonitrile containing in the polymer molecule at least 80% by weight of acrylonitrile, (2) a solvent therefor comprising a compound selected from the group consisting of the cyclic carbonates of 1,2-, 2,3-, and 1,3-dihydric aliphatic alcohols having no more than four carbon atoms in their alkylene radical, and (3) a relatively small amount of a water-soluble, hydroxy-aliphatic mono-mercaptan; removing the resulting coagulated filamentary material from said coagulating medium, washing said filamentary material with an aqueous medium.

24. A method of forming filamentary material which comprises extruding into a liquid coagulating medium, a composition comprising (1) a polymer of acrylonitrile containing in the polymer molecule at least 80% by weight of acrylonitrile, (2) ethylene carbonate, and (3) a relatively small amount of a water-soluble, hydroxy-aliphatic mono-mercaptan; removing the resulting coagulated filamentary material from said coagulating medium; and washing said filamentary material with an aqueous medium.

25. A method of forming filamentary material according to claim 24 in which N,N-dimethyl formamide is the polymer solvent.

26. A method of forming filamentary material according to claim 24 in which the water-soluble mercaptan comprises 2-hydroxy ethyl mercaptan.

27. A method of forming filamentary material according to claim 24 in which the water-soluble mercaptan comprises 3-hydroxy propyl mercaptan.

28. A method of forming filamentary material according to claim 24 in which the water-soluble mercaptan comprises 3-hydroxy-2-mercapto propane.

29. A method of forming filamentary material which comprises extruding into a liquid coagulating medium, a composition comprising (1) the polymerization product of a mixture comprising acrylonitrile and less than about 10 mole per cent of a compound selected from the group consisting of vinylpyridine, water-soluble vinylpyridine salts, mono-vinyl ethers of amino alcohols and water-soluble salts of mono-vinyl ethers of amino alcohols, (2) ethylene carbonate, and (3) a relatively small amount of a water-soluble, hydroxy-aliphatic mono-mercaptan; removing the resulting coagulated filamentary material from said coagulating medium; and washing said filamentary material with an aqueous medium.

30. A method of forming filamentary material according to claim 29 in which the copolymer is made with 2-vinyl pyridine.

31. A method of forming filamentary material according to claim 29 in which the copolymer is made with morpholinoethyl vinyl ether.

32. A method of forming filamentary material which comprises preparing a composition comprising (1) a polymer of acrylonitrile containing in the polymer molecule at least 80% by weight of acrylonitrile, (2) a solvent therefor comprising a compound selected from the group consisting of the cyclic carbonates of 1,2-, 2,3-, and 1,3-dihydric aliphatic alcohols having no more than four carbon atoms in their alkylene radical, and (3) a relatively small amount of a water-soluble, hydroxy-aliphatic mono-mercaptan; heating said composition and maintaining it at an elevated temperature; extruding said heated composition through a spinneret into a liquid coagulating medium maintained at an elevated temperature; removing the resulting coagulated filamentary material from said coagulating medium; washing said filamentary material with water.

33. A method of forming filamentary material which comprises preparing a spinning solution comprising (1) a polymer of acrylonitrile containing in the polymer molecule at least 80% by weight of acrylonitrile, (2) ethylene carbonate, and (3) between about 0.02% and 3.0% 2-hydroxy ethyl mercaptan; heating said spinning solution and maintaining it at an elevated temperature; extruding said heated spinning solution through a spinneret into a liquid coagulating medium maintained at an elevated temperature; removing the resulting coagulated filamentary material from said coagulating medium; washing said filamentary material with water; orienting the washed filamentary material by stretching and thereafter heating said oriented material to an elevated temperature while it is in a relaxed condition.

HERMAN A. BRUSON.

REFERENCES CITED

The following references are of record in the file of this patent:

UNITED STATES PATENTS

| Number | Name | Date |
|---|---|---|
| 2,404,714 | Latham | July 23, 1946 |
| 2,404,717 | Houtz | July 23, 1946 |
| 2,426,719 | Watkins | Sept. 2, 1947 |
| 2,434,054 | Roedel | Jan. 6, 1948 |
| 2,456,360 | Arnold | Dec. 14, 1948 |

FOREIGN PATENTS

| Number | Country | Date |
|---|---|---|
| 896,083 | France | Apr. 17, 1944 |
| 236,024 | Switzerland | May 16, 1945 |